United States Patent [19]

Thielmann

[11] Patent Number: 4,834,280
[45] Date of Patent: May 30, 1989

[54] DEVICE FOR CLEANING THE GAS NOZZLE OF A WELDING TORCH

[76] Inventor: Friedolin Thielmann, Fliederstrasse 9, D-6342 Haiger 9, Fed. Rep. of Germany

[21] Appl. No.: 200,438

[22] Filed: May 31, 1988

[30] Foreign Application Priority Data

Jun. 1, 1987 [DE] Fed. Rep. of Germany ... 8707786[U]

[51] Int. Cl.$^4$ .............................................. B23K 9/32
[52] U.S. Cl. .................................... 228/57; 219/137.2
[58] Field of Search ........................... 228/57, 45, 18; 219/125.1, 137.2, 137.43, 136

[56] References Cited

U.S. PATENT DOCUMENTS

| 4,645,901 | 2/1987 | Scholz et al. | 219/137.2 |
| 4,702,195 | 10/1987 | Thielmann | 219/136 |
| 4,778,976 | 10/1988 | Litt et al. | 219/137.2 |

FOREIGN PATENT DOCUMENTS

| 232673 | 12/1984 | Japan | 219/137.2 |
| 245979 | 11/1986 | Japan | 219/137.2 |

*Primary Examiner*—Kenneth J. Ramsey
*Attorney, Agent, or Firm*—Edmund M. Jaskiewicz

[57] ABSTRACT

A device to clean the nozzle of a welding torch in which the nozzle is inserted into the cleaning device, is cleaned by rotating blades and after cleaning the nozzle is sprayed with an anti-adhesive. In front of the access opening there is a cutting device which, when the nozzle is removed from the access opening, cuts off the tip of the welding rod that protrudes out of the nozzle.

9 Claims, 3 Drawing Sheets

DEVICE FOR CLEANING THE GAS NOZZLE OF A WELDING TORCH

The present invention relates to a cleaning device for the gas nozzle of a welding torch, more particularly, to a cutting device installed on the front of the cleaning device for cutting off the tip of a welding rod protruding out of the nozzle when the nozzle is removed from the access opening.

During welding, the welding rod is inserted through the nozzle used for the gas supply and the welding rod can be controlled with the aid of a robot to approach the weld location. During the welding process itself, the weld material spatters to a great extent and are deposited and accumulate on the nozzle. These impurities gradually close the nozzle and interrupt the gas supply. Therefore, the nozzle must be frequently cleaned in order that the welding operation proceeds satisfactorily.

One such cleaning device known in the art is disclosed in U.S. Pat. No. 4,702,195 wherein the robot-controlled nozzle is inserted through an access opening into the cleaning device and is centered and locked in position therein. A motor rotates axially extending blades which are inserted into the nozzle to scrape the nozzle clean and the motor and blades are then lowered after this cleaning process. A spraying device is then actuated and sprays the nozzle with an anti-adhesive to reduce the deposits during welding. After spraying the nozzle is generally removed from the cleaning device through the access opening for further use.

It is known that after termination of the welding process a formation of drops occur on the end of the welding rod which formation is caused by the melting process of the welding rod. This formation of drops is insignificant in a brief interruption of the welding process because then the nozzle and the welding rod and the drops thereon are still so hot that a subsequent welding operation can follow immediately without their being any solidification of the drop material.

However, if the nozzle is cleaned in the meantime, the nozzle and the welding rod cool off to such an extent that the drops solidify, Therefore, even though the nozzle has been scraped clean, the presence of the drop material on the end of the welding rod will impede the gas flowing out of the nozzle so that the gas not ignite immediately and this in term hinders the welding process.

It is therefore the principal object of the present invention to provide a novel and improved cleaning device which will enable the cleaned nozzle to begin a subsequent welding operation immediately after cleaning.

It is a further object of the present invention to provide such a cleaning device which will cut off the tip of a welding rod protruding from the nozzle when the nozzle is removed from the access opening of the cleaning device.

According to one aspect of the present invention, such a cleaning device may comprise a housing having an access opening for a gas nozzle and there being stops within the housing against which a gas nozzle inserted through the access opening is positioned. A piston is moved against the positioned nozzle to lock the gas nozzle in position against the stops and rotatable cutting blades are moved axially into the positioned gas nozzle to scrape weld splatters therefrom. There are means laterally of the positioned gas nozzle and inclined toward the gas nozzle to spray an anti-adhesive agent thereon when the gas nozzle is secured in its position. In front of the access opening there is provided means for cutting off the tip of a welding rod protruding from the nozzle when the nozzle is removed from the access opening. As a result of cutting off the solidified drops from the end of the welding rod when the cleaned nozzle is being removed from the cleaning device, the welding process can begin again immediately upon being positioned to a new weld location.

Other objects and advantages of the present invention will be apparent upon reference to the accompanying description when taken in conjunction with the following drawings, which are exemplary, wherein.

Proceeding next to the drawings wherein like reference symbols indicate the same parts throughout the various views a specific embodiment and modifications of the present invention will be described in detail.

Figure 1:
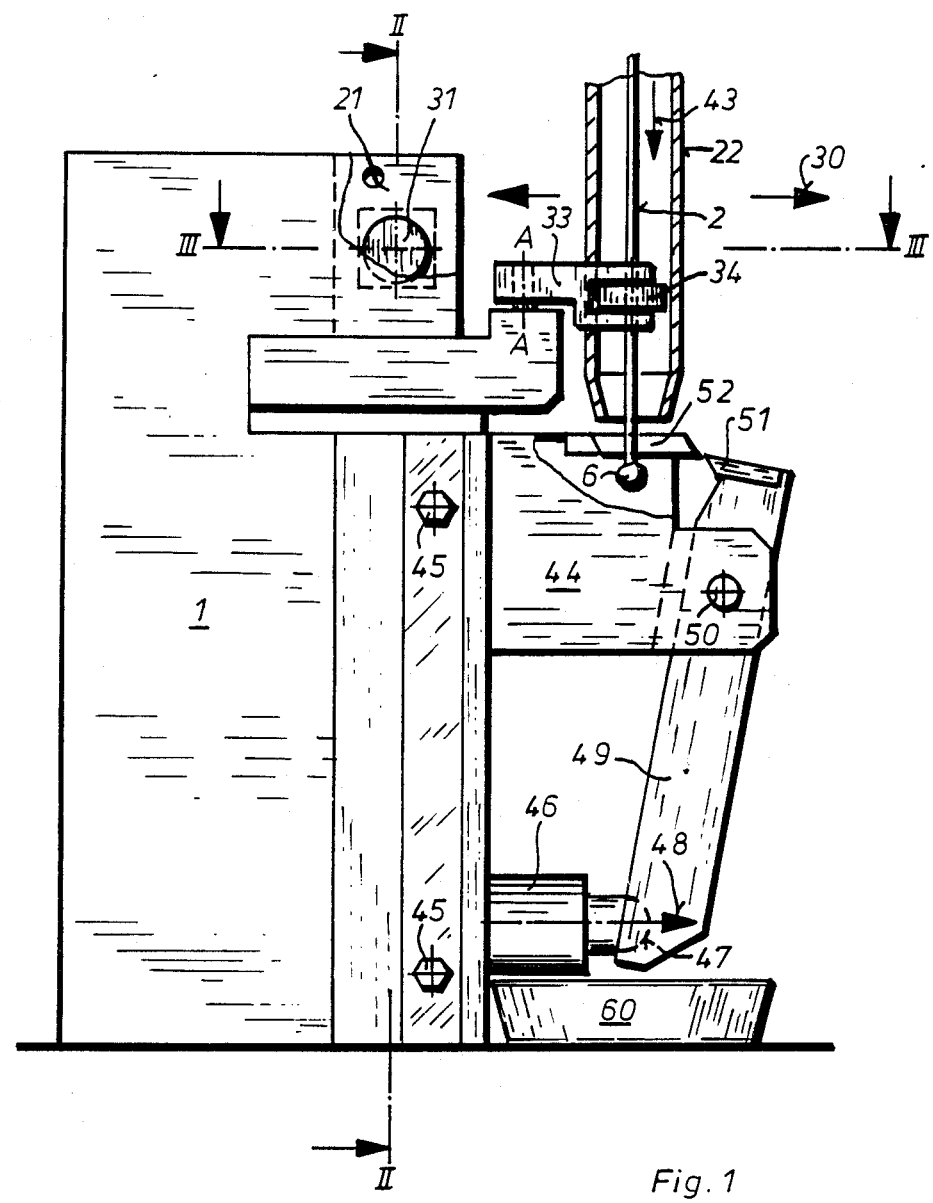
FIG. 1 is a side elevation view of a cleaning device according to the present invention with the welding nozzle being shown in a half-inserted position.

As may be seen in FIG. 1, a cleaning device according to the present invention is indicated generally as 1. As may be seen in FIGS. 2 and 3, the cleaning device comprises a housing 20 having an access opening 21 which is formed in the top and side walls of the housing. A nozzle 22 which has a welding rod 2 extending axially therethrough may be inserted and removed from the access housing in the direction of the arrows shown in FIG. 1.

Figure 2:
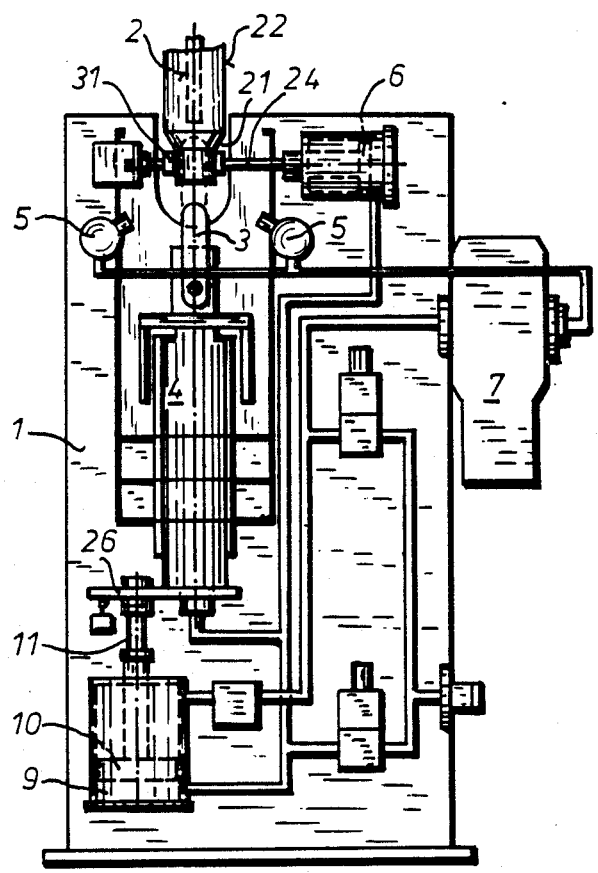
FIG. 2 is a sectional view taken along the line II—II of FIG. 1.
Figure 3:
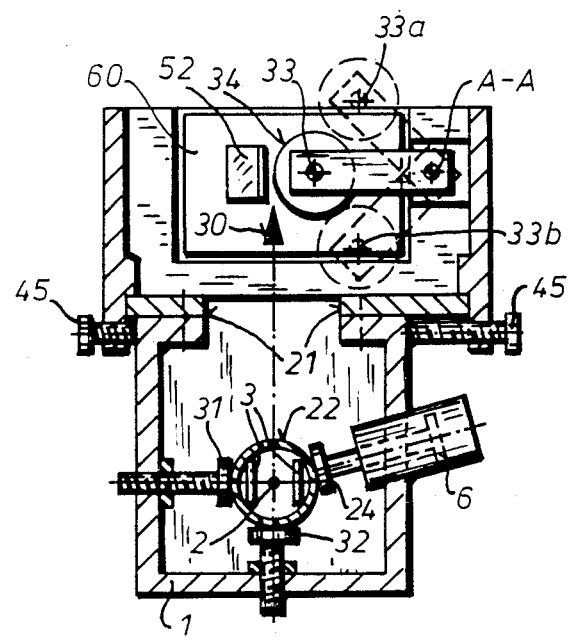
FIG. 3 is a sectional view taken along the line of III—III of FIG. 1.

Upon insertion of the nozzle 22 into the cleaning device 1, the nozzle is positioned against stops 31 and 32 and then locked into position by a piston 24. As seen in FIG. 2, a hydraulic cylinder 9 will raise a piston 10 whose piston rod 11 will act upon a disc or plate 26 which raises a motor 4 on the ends of which are positioned axially extending blades 3. The blades 3 are raised to such a position that upon rotation the blades will scrape away any impurities or accumulations of spatter within the nozzle 22. The motor 4 is then lowered by a hydraulic switch so that nozzles 5 connected to a supply receptacle 7 can spray an anti-adhesive into the nozzle 22. The piston 24 is then released by a hydraulic cylinder 6 so that the nozzle 22 can be removed from the cleaning device in the direction of the arrow 30 shown in FIG. 1. In front of access opening 21 there is a lever 33 which is pivotable about axis A—A and has a roller 34 on its end which roller slides over the nozzle 22 during insertion and removal and a result causes the lever 33 to pivot about is axis.

Upon insertion of the nozzle 22 into the cleaning device, the lever 33 is moved into position 33b. This position can be used to actuate a switch which clamps the nozzle 22 in its cleaning position but also to push the welding rod 2 a short distance out of the nozzle in the direction of the arrow 43 so that the accumulation of drop material 6 on the end of the welding rod is brought into the area of a cutting device indicated generally as 44. However, the axial outward movement of the rod can also be controlled by the computer that actuates the robot.

The cutting device 44 is attached by screws or bolts 45 to the housing 20 of the cleaning device. The cutting device includes a hydraulic cylinder 46 which is actuated by the pivotal movement of the lever 33 into position 33a when the nozzle 22 is removed from the cleaning device in the direction of arrow 30. When the lever 33 is in position 33a, control means known in the art will be actuated to actuate the cylinder 46 to cause the piston 47 to move outwardly in the direction of arrow 48 to act upon a lever 49 which is pivotably mounted about a pin or bolt 50. On the other or upper end of the lever 49 there is mounted a cutting blade 51. The cutting device 44 has mounted thereon a stationary cutting blade 52 which is positioned in cutting relationship with the movable blade 51. Thus, when the nozzle 22 is removed from the cutting device, the drop material 6 on the end of the welding rod 2 is cut off by the cutting action of blades 51 and 52. A suitable receptacle 60 is positioned below the cutting device 1 as shown in FIG. 1 to collect the cut off drops.

After the drops 6 are cut off, the welding nozzle can now be used immediately in a subsequent welding operation without any likelihood of the flow of gas to the nozzle being impeded by drop material on the welding rod.

It will be understood that this invention is susceptible to modification in order to adapt it to different usages and conditions, and accordingly, it is desired to comprehend such modifications within this invention as may fall within the scope of the appended claims.

What is claimed is:

1. A device for cleaning the gas nozzle of a welding torch in which weld splatters have accumulated on the nozzle comprising a housing (20) having a top and side and there being an access opening (21) for a gas nozzle on said top and side, a pair of spaced stops (31) (32) within said housing and against which a gas nozzle inserted through said access opening is positioned, a piston (24) movable against said positioned nozzle to secure said gas nozzle in position against said stops, rotatable cutting blades (3) axially movable into and out of said positioned gas nozzle to scrape weld splatters therefrom, means laterally of said positioned gas nozzle and inclined toward said gas nozzle to spray an anti-adhesive agent thereon when said gas nozzle is secured in its said position, and means (44) in front of said access or opening for cutting off a tip of a welding rod (2) protruding from said nozzle when said nozzle is removed from said access opening.

2. In a device as claimed in claim 1 wherein said cutting means comprises a pivotable lever (33) disposed in front of said access opening to actuate said cutting means in response to removal of said nozzle from said access opening.

3. In a device as claimed in claim 2 wherein said lever (33) is pivotable in response to insertion of said nozzle into said access opening, and a control device actuated by said pivotal movment of said control level to actuate the cleaning device.

4. In a device as claimed in claim 3 and further comprising means actuated by said control device to move said welding rod a short distance out of the gas nozzle.

5. In a device as claimed in claim 1 wherein said cutting means comprises first and second cutting blades (51,52) movable with respect to each other in cutting relationship, said first blade (52) being fixed and said second blade (51) being movable, and a power actuated piston (47) and means for operatively connecting said second blade (51) to said piston.

6. In a device as claimed in claim 5 wherein said connecting means comprises a lever (49).

7. In a device as claimed in claim 1 wherein said cutting means is attachable to said cutting device.

8. In a device as claimed in claim 1 and further comprising a receptacle (60) below said cutting means to collect tips of welding rods which are cut off.

9. In a device as claimed in claim 1 wherein said cutting means comprises a separate component which can be installed on said cleaning device.

* * * * *